T. VON ZWEIGBERGK.
TRANSMISSION GEAR.
APPLICATION FILED JUNE 28, 1918.

1,403,658.

Patented Jan. 17, 1922.

Inventor,
Thorsten von Zweigbergk,
By Bates & Macklin, Attys.

UNITED STATES PATENT OFFICE.

THORSTEN von ZWEIGBERGK, OF LANCASTER, ENGLAND.

TRANSMISSION GEAR.

1,403,658. Specification of Letters Patent. Patented Jan. 17, 1922.

Application filed June 28, 1918. Serial No. 242,501.

(GRANTED UNDER THE PROVISIONS OF THE ACT OF MARCH 3, 1921, 41 STAT. L., 1313.)

*To all whom it may concern:*

Be it known that I, THORSTEN VON ZWEIG-BERGK, a citizen of the United States, residing at Lancaster, in the county of Lancaster, England, have invented a certain new and useful Improvement in Transmission Gears, (for which I have filed application in Great Britain June 30, 1917, Patent No. 114,728,) of which the following is a full, clear, and exact description, reference being had to the accompanying drawings.

This invention relates to transmission gear of the type in which the driving and driven shafts are connected by epicyclic gearing and the third member of the epicyclic train is connected with one member of a dynamo, the other member of which is connected with the driving shaft. In transmission gear of this type the amount of slip between the field and armature will control the proportion of the speed transmitted from the driving shaft to the driven shaft.

The present invention is especially well adapted for forming a variable gear connection between the engine and running gear of a motor car. The means for varying the electro-magnetic slip may be simply a variable resistance included in the electric circuit, while a friction brake on the member rotating independently of the driving shaft may provide for locking such member stationary and thus give the maximum reaction at the epicyclic train. I prefer to provide a friction clutch acting on the epicyclic gearing and adapted to lock it together so that the driving and driven shafts will then rotate as a unit.

The novel characteristics of my invention will be more apparent from the following detailed description of an improved embodiment thereof and from the appended claims.

Figure 1:
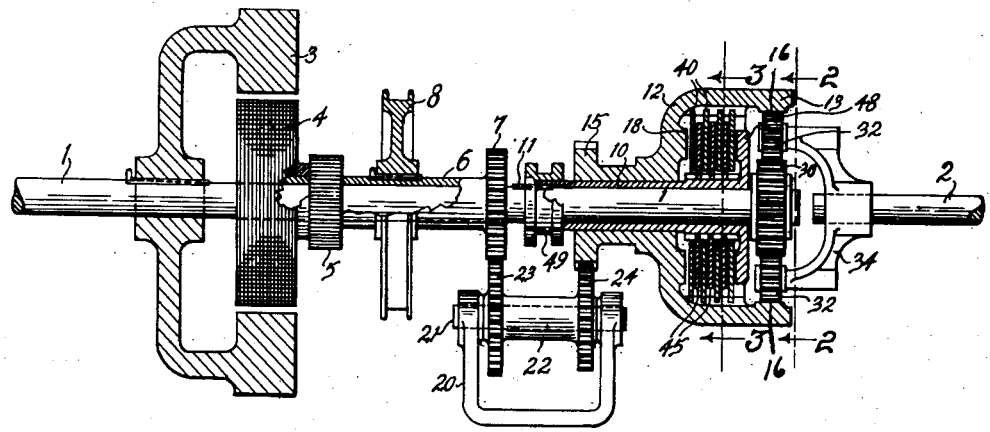
Figures 2, 3:
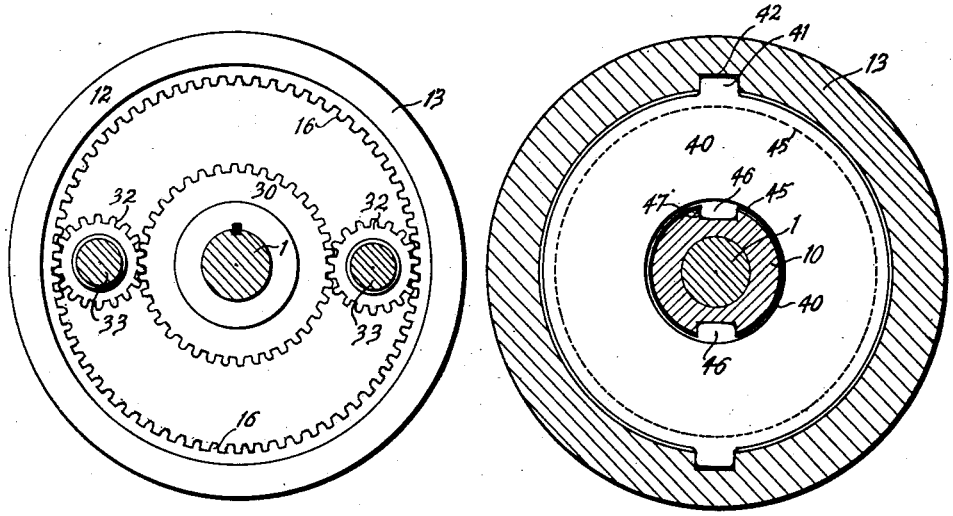

In the drawings, Fig. 1 is a diagrammatic longitudinal section of gearing embodying my invention; Figs. 2 and 3 are enlarged cross sections through the epicyclic gearing and friction clutch respectively, as indicated by the lines 2—2 and 3—3 on Fig. 1.

Referring particularly to the embodiment shown in the drawings, 1 indicates a driving shaft and 2 a driven shaft aligned with the driving shaft and connected with it by epicyclic gearing hereinafter described. Rigid on the driving shaft is the field magnet system 3. The cooperating armature 4 and its commutator 5 are rigidly mounted on a sleeve 6 which surrounds and is loose upon the driving shaft 1. The brushes for the commutator are carried in any suitable manner, not shown. The circuit connections to the electric machine constitute no part of my invention, but may be of any approved arrangement, such, for example, as illustrated in Fig. 5 of Patent No. 1,307,230, to T. and G. Zweigbergk. Keyed upon the sleeve 6 is a brake drum 8 controlled by any suitable band brake, not shown.

The sleeve carrying the armature and commutator is geared with one member of the epicyclic gearing. As shown in Fig. 1, there is mounted upon the shaft 1 a quill 10 slidable on the shaft but compelled to rotate with it by means of a key 11. Loosely journaled on this quill is the member 12 having a bell-shaped head 13 which carries the internal gear 16 forming part of the epicyclic gearing. The member 12 has a spur gear 15 which is connected with the spur gear 7 on the sleeve 6 by suitable spur-gearing adapted to change the speed ratio. As shown in Fig. 1, 20 indicates any suitable frame for this back gearing, and 21 a stationary shaft carried by the frame. Journaled on this shaft is a hub 22 carrying a spur gear 23 meshing with the gear 7, and a spur gear 24 meshing with the gear 15.

Describing now the epicyclic gearing, there is a sun gear 30 rigidly secured on the rear end of the driving shaft 1. Meshing with this gear are a pair of pinions 32 journaled on studs 33 carried by a yoke 34, which is rigid on the driven shaft 2. Adjacent to their outermost points, the pinions 32 mesh with the internal gear 16 which is carried by the bell-shaped head 13, and may be cut from the integral material thereof.

A friction clutch is provided between the member 12 carrying the internal gear 16 and the shaft 1 carrying the sun gear 30. This clutch is preferably of the multiple disk type, housed within the bell-shaped head 13 and controlled by the longitudinal movement of the quill 10. Thus, there are preferably a plurality of disks of which alternate ones 40 have ears 41, slidable in key ways 42 in the head 13, while the other disks 45 have inwardly extending ears 46 engaging a key way 47 in an enlarged portion of the quill 10. The bell-shaped head 13 has an abutment surface 18 for the slidable disks. The quill 10 is provided with a flange 48 adapted to abut the opposite side of the set of disks. A suitable collar 49 is provided on the quill for engagement of shipper mechanism. When the shipper mechanism is operated the quill is drawn toward the left and the disks are clamped between the flange 48 and the surface 18, thus locking the member 12 to the sleeve 10 and shaft 1. As this locks together both the sun gear and the internal gear the whole planetary system is locked, so that the shafts 1 and 2 can only rotate as a unit.

The operation of my invention will be best understood from the description of specific instances, thus: If the engine is to start against a heavy load requiring the lowest possible gear, the brake is applied to the drum 8 sufficiently to lock it stationary. This, through the gearing 7, 23, 24, 15, locks the internal gear 16. Accordingly the whole power of the engine, acting through the shaft 1 and the sun gear 30 is transmitted to the shaft 2, the pinions 32 reacting on the stationary gear 16 and rotating on their studs 33, while these studs travel about the sun. In this condition the circuit of the armature 4 is left open, so that no current is produced.

When a slightly higher gear is to be employed, the armature circuit is closed through a relatively high resistance and the brake released from the drum 8. By adjusting the resistance, the speed transmitted from the field structure 3, which is rotating at engine speed, to the armature may vary as desired. If the resistance is high a small proportion of speed is transmitted and the internal gear 16 accordingly rotates slowly and some of the driving force from the sun 30 is transmitted to the internal gear so that the shaft 2 does not receive so much torque. As the resistance is cut out the speed transmitted to the armature increases, which increases the travel of the internal gear 16, which increases the speed and reduces the torque transmitted to the shaft 2.

It will also be apparent that after the engine is started, when it is desired to start the drive of the driven shaft against a heavy load, the brake may be released from the drum 8, and the armature connected with considerable resistance, the result being that the armature will be driven in a reverse direction from the drive shaft and initially, no drive will be transmitted to this shaft. As the resistance is cut out of the armature circuit, however, the consequent electric drag will tend to pull the armature in the direction of the rotating engine shaft with the result that its rotation in the opposite direction will be decreased and eventually the driven shaft 2 will be rotated but at a less speed than would be the case if the brake were applied to the drum 8. As the device approaches the position where the armature 4 tends to be held stationary, the brake may be applied to the drum 8 if desired so as to cause all of the torque to be transmitted by mechanical means. The subsequent release of the brake and the further removal of resistance from the armature circuit will result in a faster drive of the shaft 2 until such time as it is feasible to use the clutch mechanism as has already been described. Often it is sufficient to start the drive shaft originally with the drum 8 held by the brake as is previously described.

Accordingly, by simply varying the resistance in the armature circuit, the armature is made to follow the field more or less rapidly until a maximum speed is reached somewhat below that of the field. In the preferred form the difference between the speed of the field and that of the armature, that is to say, the slip of the armature, will seldom be less than about fifty revolutions per minute. The proportions of the back-gearing are so chosen that the gear 15 rotates at about seventy per cent of the speed of the gear 7. As a result, the maximum speed of the head 12 will be seventy per cent of the maximum obtainable speed of the armature. Now, when this speed, or nearly this speed, has been reached the clutch is closed by shifting the collar 49 and this gradually clamps the rotating head 12 to the quill 10 and shaft 1. This results in locking the gear 16 to the gear 30 and this locks the planets 32 so that the driven shaft 2 rotates as a unit with the driving shaft 1. This transition from the maximum speed with the clutch open to the unitary driving is gradual by reason of the slipping of the clutch.

When running at top speed with the clutch engaged, the armature will be driven faster than its field. In the embodiment shown, where the speed ratio of the gears 15 and 7 is as 1 to .7, the armature may rotate about forty-two and one-half per cent faster than the field. Under these circumstances, the armature may be employed to generate current which if desired may be utilized in lighting lamps, charging a battery, etc.

An important characteristic of the present invention is the back gearing connecting the armature with the planetary gearing, this back gearing having intermediate wheels, as 23 and 24, which do not rotate about the axis of the driving shaft as does the epicyclic train. This back-gearing produces a reaction against a fixed outside fulcrum which enables the operation described. An advantageous feature of the construction described is its extreme simplicity and compactness, by reason of which it is especially well adapted for employment on motor cars.

Having thus described my invention, what I claim is:

1. In an electro-magnetic transmission gear, the combination of a driving member, a driven member, a dynamo electric machine, one member of which is connected with the driving member, epicyclic gearing connected with the driving member and with the driven member, a member forming the reaction member of the epicyclic train, said member being connected to a friction brake and to the other member of the dynamo electric machine by means including change speed gearing fulcrumed on a fixed axis independent of the axis of the driving shaft.

2. In an electro-magnetic transmission, the combination of a driving shaft, a driven shaft, a sun and planet, one carried by the driving shaft and the other by the driven shaft, a reaction member meshing with the planet, and a dynamo electric machine, one member of which is connected with the reaction member by change speed gearing having a fulcrum independent of the axis of the driving shaft, and the other member of which dynamo electric machine is connected with the driving shaft.

3. In an electro-magnetic transmission, the combination of a driving shaft carrying a sun, a driven shaft having a planet meshing with the sun, a member having a gear meshing with the planet, and a dynamo electric machine, one member of which is connected with the member having said gear by gearing having a fulcrum and independent of the axis of the driving shaft, and the other member of which dynamo electric machine is connected with the driving shaft.

4. In an electro-magnetic transmission, the combination of a driving shaft having a sun gear thereon, a driven shaft having a planet meshing with the sun, a member loosely surrounding the driving shaft and having an internal gear meshing with the planet, an armature connected with said member, and a cooperating field connected with the driving shaft.

5. The combination of a driving shaft, a sun gear thereon, a driven shaft, a planet carried thereby meshing with the sun gear, a member loosely surrounding the driving shaft and having an internal gear with which the planet meshes, an armature loosely surrounding the driving shaft, spur gearing between the armature and said member, and a field rigid with the driving shaft.

6. The combination of a driving shaft, a driven shaft, epicyclic gearing connecting them and including a gear on a rotatable third member, a dynamo electric machine, one member of which is connected with the driving shaft and the other with said third member to be rotated in the opposite direction to the driving shaft and at a different speed from said third member, and a friction clutch adapted to lock the epicyclic gearing independently of the dynamo-electric machine.

7. In an electro-magnetic transmission, the combination of a driving shaft having a sun gear thereon, a driven shaft having a planet meshing with the sun, a member loosely surrounding the driving shaft and having an internal gear meshing with the planet, a friction clutch adapted to lock the member having the internal gear to the driving shaft, and a dynamo-electric machine, one member of which is connected to the member having the internal gear and the other to the driving shaft.

8. The combination, with a driving shaft, a driven shaft, epicyclic gearing connecting the driving shaft with the driven shaft, a member having a hollow head carrying an internal gear forming part of the epicyclic gearing, one member of which epicyclic gearing is connected with the driving shaft and the other with said hollow head, and a friction clutch within the hollow head adapted to lock the epicyclic gearing.

9. The combination, with a driving shaft, a driven shaft, epicyclic gearing connecting the driving shaft with the driven shaft, a hollow head carrying an internal gear forming a part of said epicyclic gearing, a dynamo electric machine, one member of which is rigidly connected with the driving shaft, and the other connected with said hollow head by change speed gearing having a fixed axis of rotation outside of the axis of the drive shaft, and a friction clutch within the hollow head adapted to lock the epicyclic gearing.

10. In an electro-magnetic transmission, the combination with sun and planet gears, of a driving shaft and a driven shaft carrying said gears, a sleeve slidable on one of said shafts and keyed thereto, a member loosely surrounding the sleeve and having an internal gear meshing with the planet, a friction clutch controlled by said sleeve and adapted to clamp it to the internal gear member, and a dynamo electric machine, one member of which is connected with the internal gear member and the other member of which is connected with the driving shaft.

11. The combination of a driving shaft, a driven shaft, epicyclic gearing connecting them and having a third member rotatable in the opposite direction from the driving shaft, a dynamo electric machine, one member of which is connected with the driving shaft and the other with said third member, and a brake acting on said other member of said dynamo electric machine, and a clutch for connecting said third member to rotate with the driving shaft.

12. The combination of driving and driven shafts, a dynamo electric machine, one member of which is connected with the driving shaft, mechanism including epicyclic gearing connecting the driving shaft with the driven shaft and with the other member of the dynamo electric machine in a manner to rotate said other member in a direction opposite to that of the driving shaft and at a different speed therefrom, and means for locking the gearing independently of the electric machine.

13. The combination of driving and driven shafts, a dynamo electric machine, one member of which is connected with the driving shaft, mechanism including epicyclic gearing connecting the driving shaft with the driven shaft and with the other member of the dynamo electric machine in a manner to rotate said other member in a direction opposite to that of the driving shaft and at a different speed therefrom, when the driven shaft is stationary and a brake acting on the electric machine.

14. The combination of a driving shaft, a driven shaft, a dynamo electric machine having one member connected with the driving shaft, gear mechanism connecting the driving shaft with the driven shaft and with the other member of the electric machine, whereby said other member is rotated in a direction opposite to that of the driving shaft and at different speed therefrom, means for locking a portion of said gear mechanism independently of the electric machine, and a brake acting on the electric machine.

In testimony whereof, I hereunto affix my signature.

THORSTEN VON ZWEIGBERGK.